UNITED STATES PATENT OFFICE.

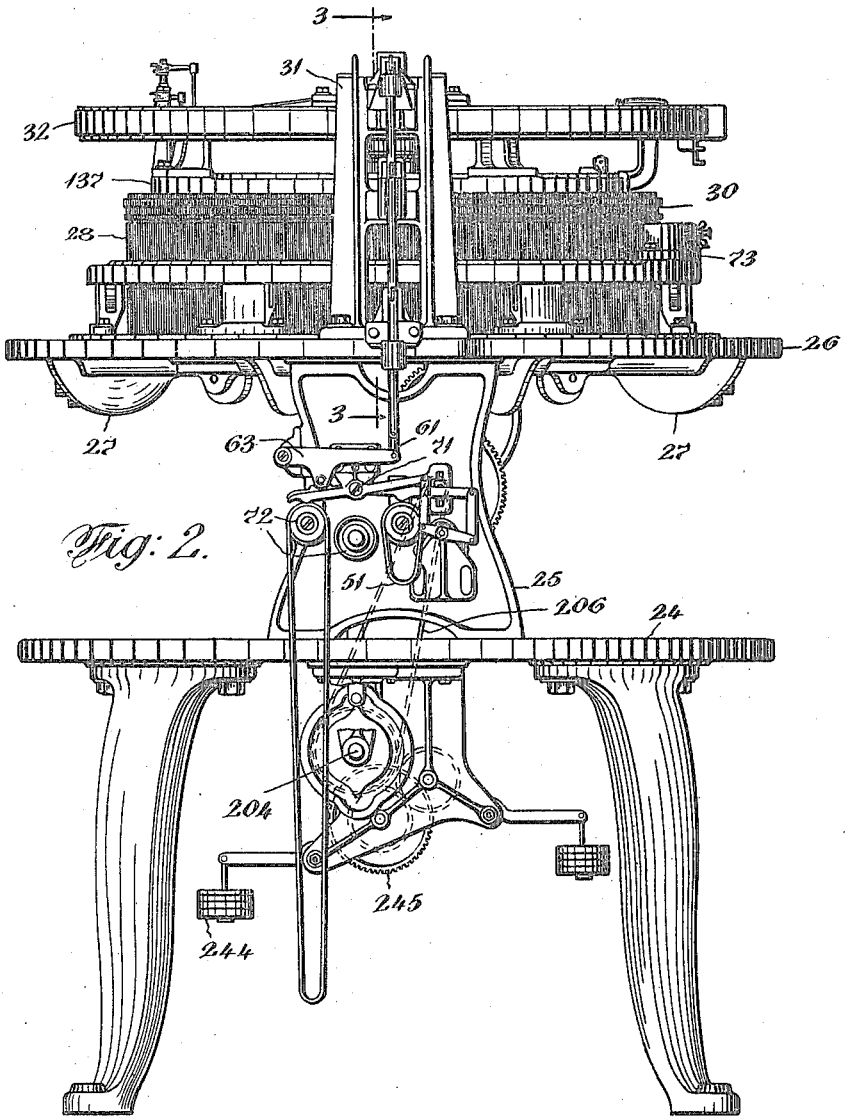

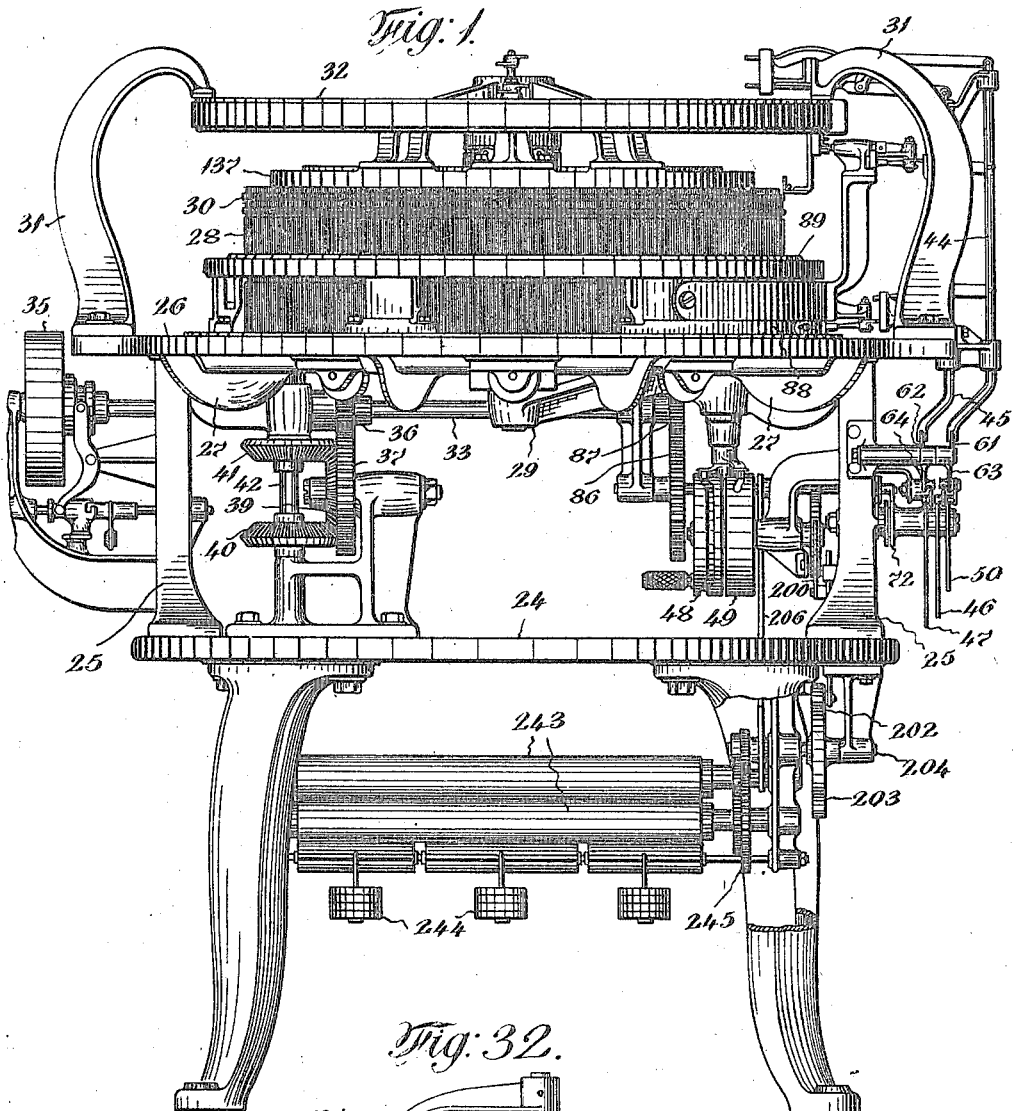

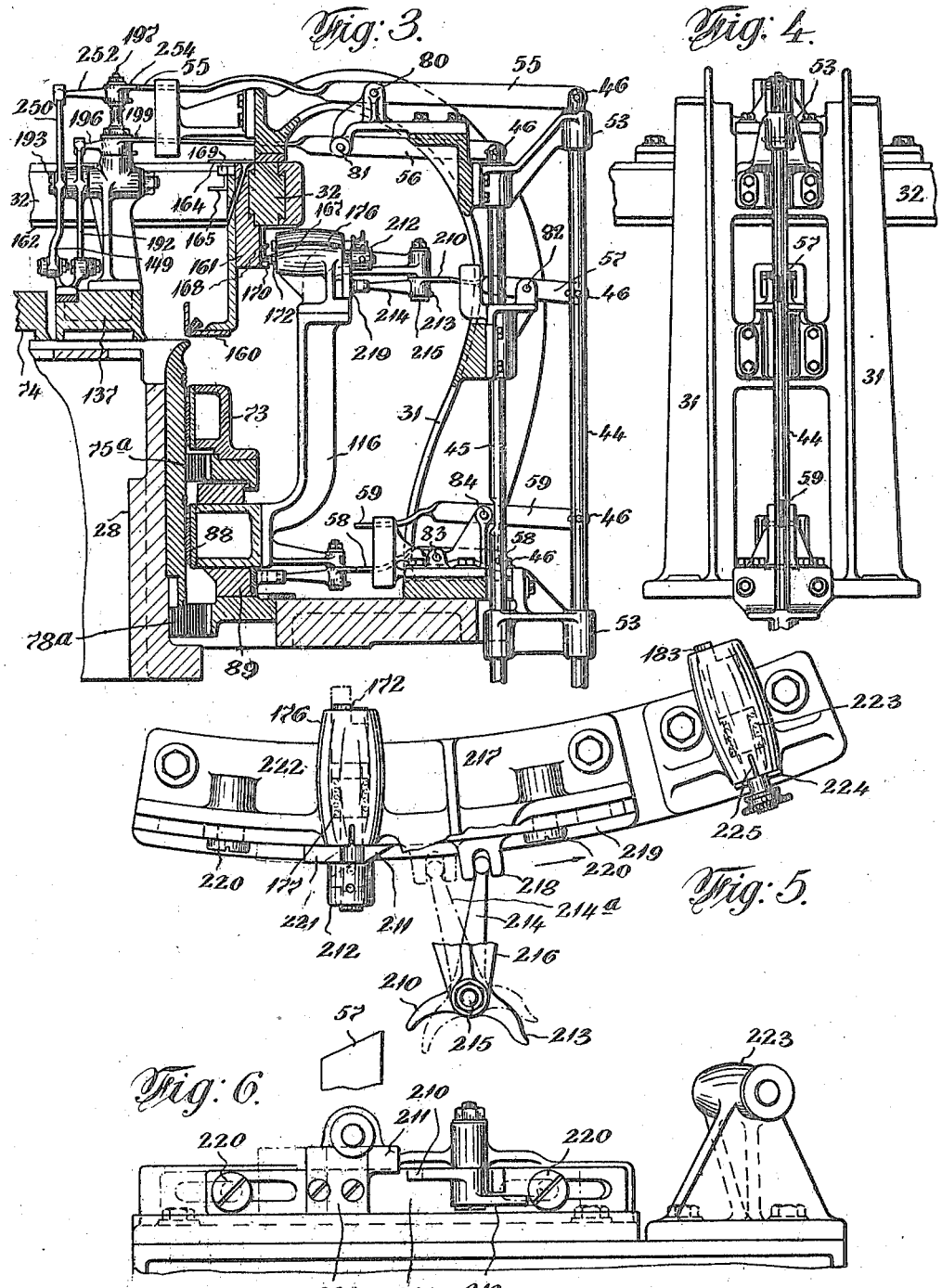

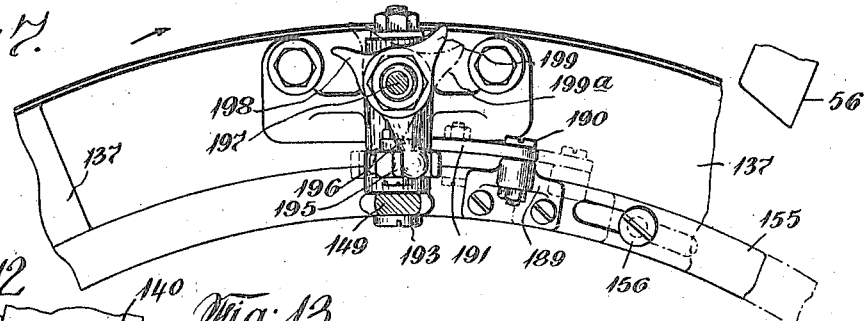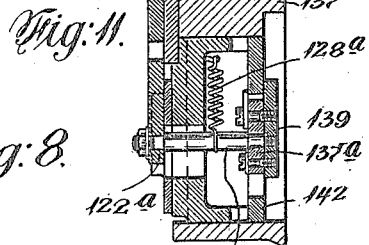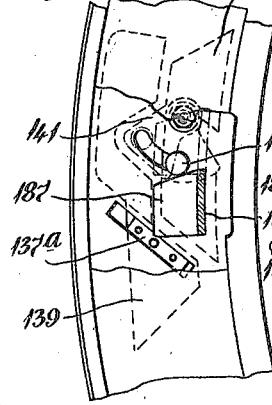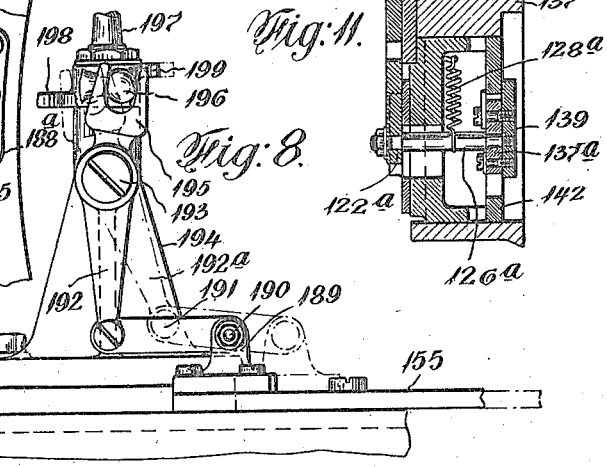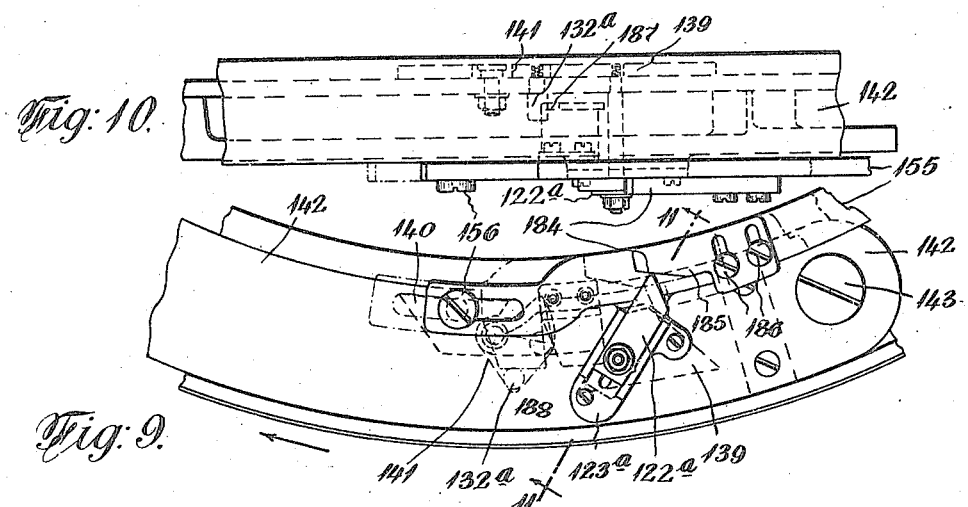

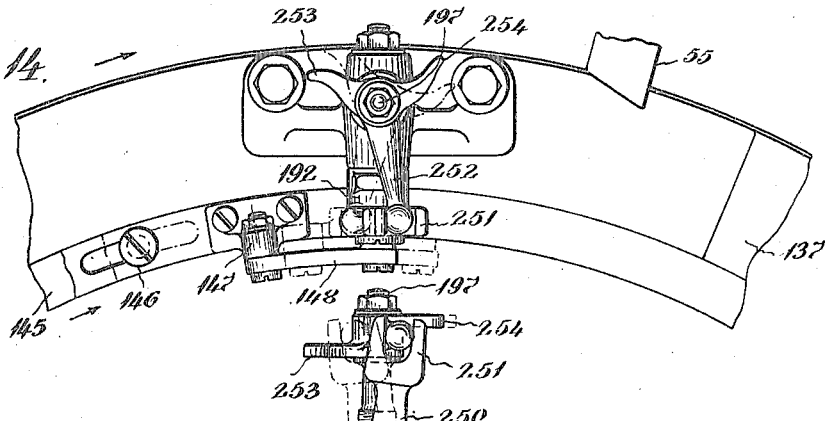
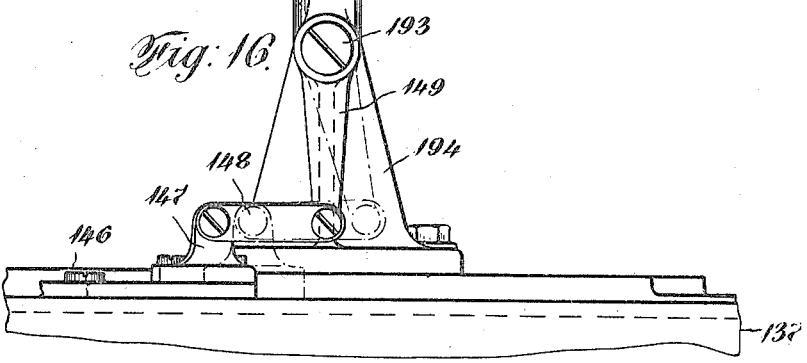
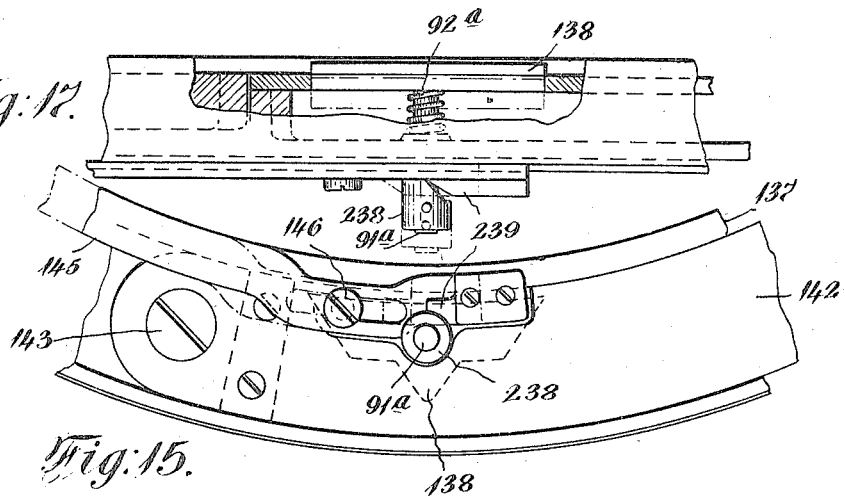

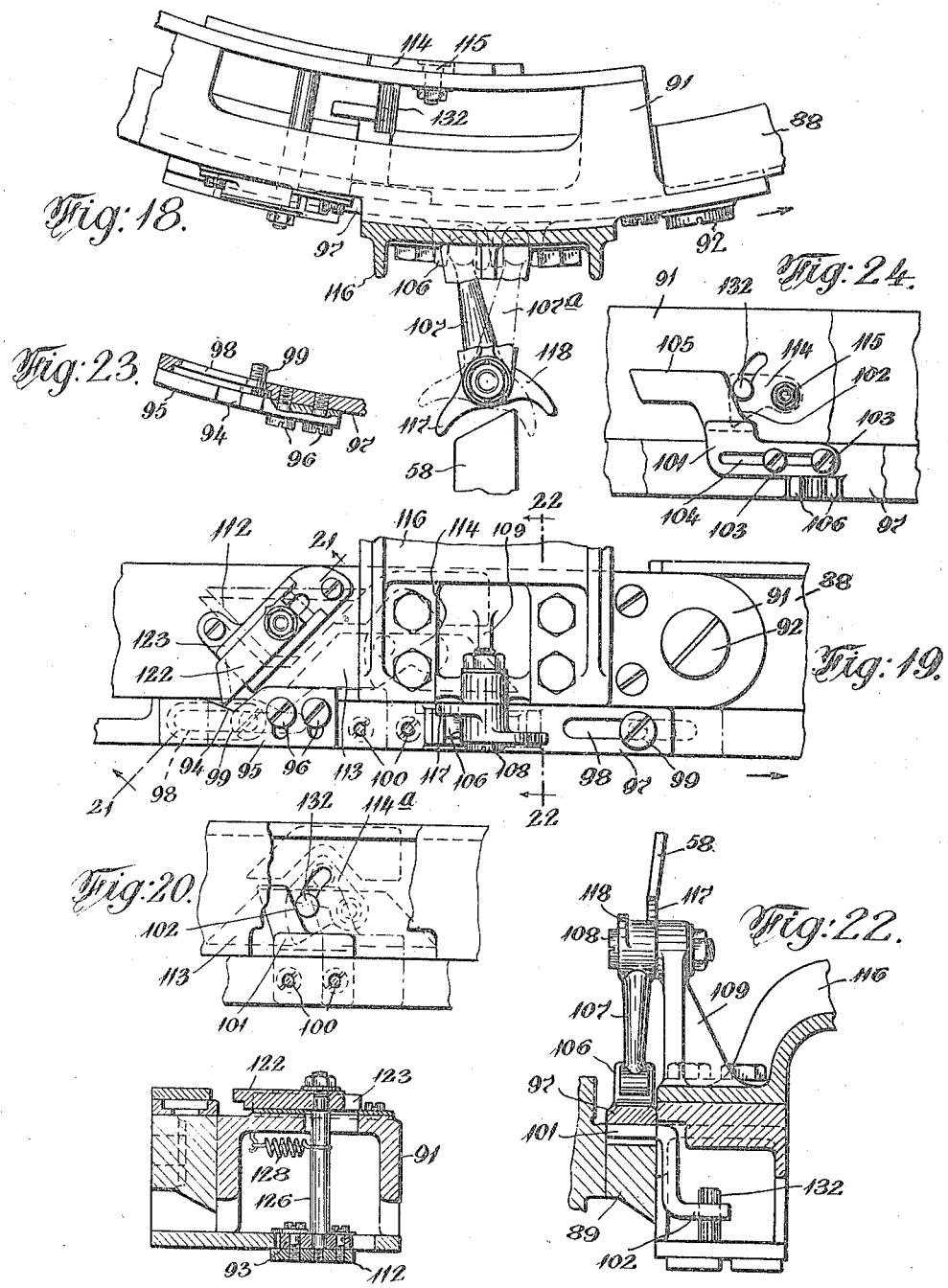

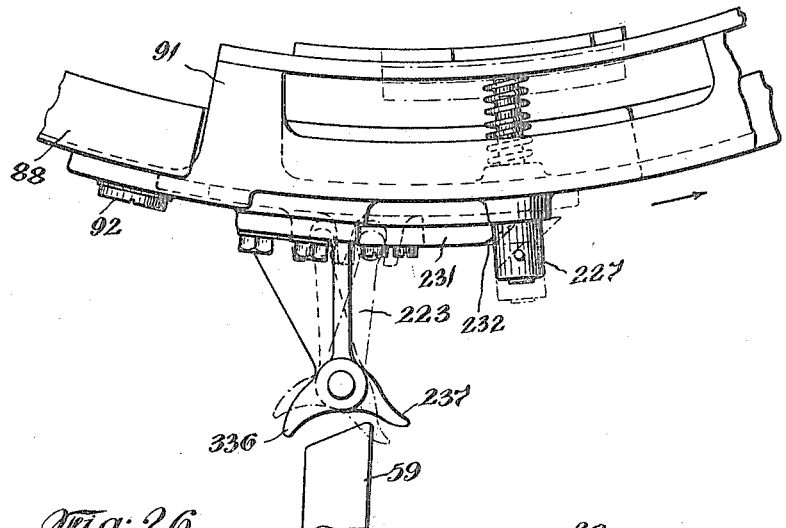
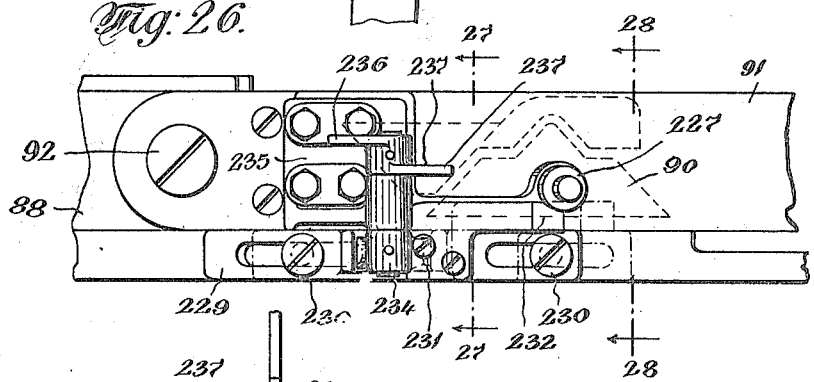
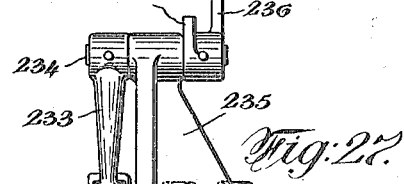
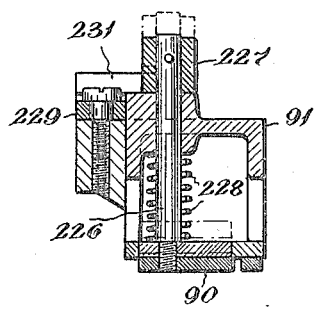

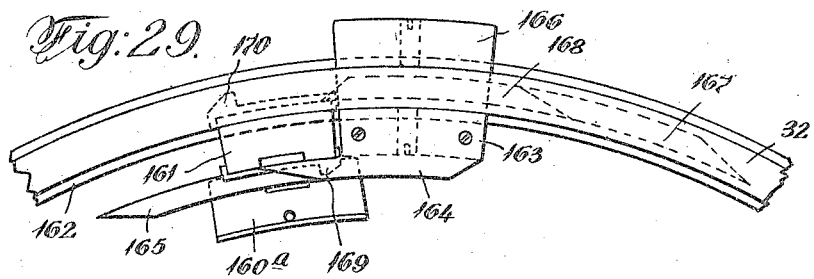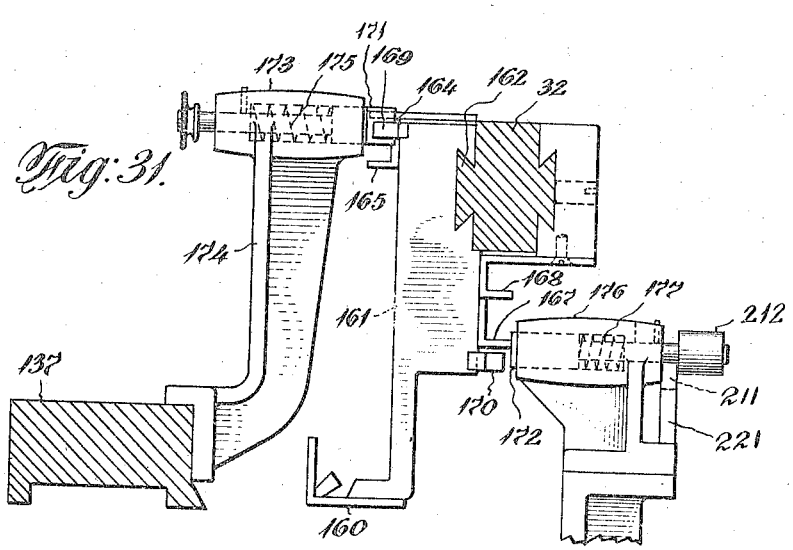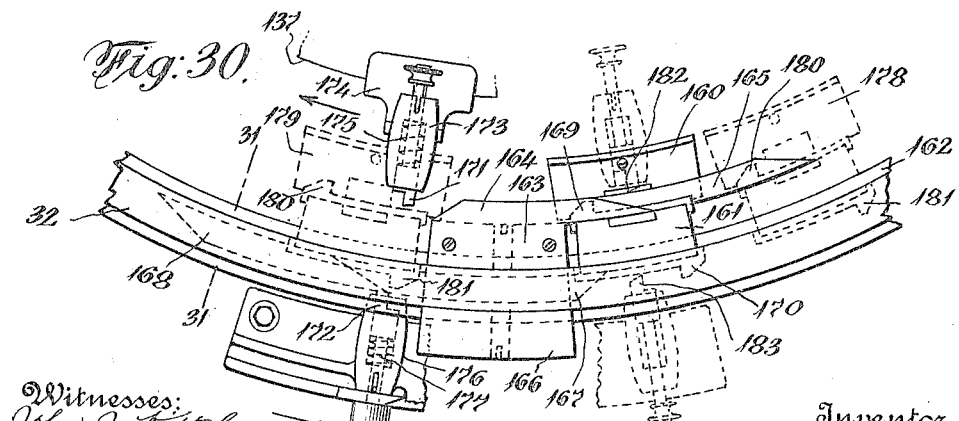

HERMANN A. KLEMM, OF HARRISON, NEW YORK.

KNITTING-MACHINE.

1,257,492.	Specification of Letters Patent.	Patented Feb. 26, 1918.

Application filed December 3, 1914. Serial No. 875,227.

*To all whom it may concern:*

Be it known that I, HERMANN A. KLEMM, a citizen of the United States of America, residing in Harrison, county of Westchester, State of New York, having invented certain new and useful Improvements in Knitting-Machines, of which the following is a specification.

This invention relates to improvements in automatic controlling mechanism of the needle cams and of the separating thread laying means, of that class of knitting machines shown and described in my application for Letters Patent, Ser. No. 838,844, filed May 15, 1914. This machine comprises a cylindrical needle bed and a horizontal or disk needle bed, each carrying two groups of needles, actuated by two sets of cams on rotating cam carriers, said cams acting alternately on the two groups of needles of their respective needle beds.

In the accompanying drawings, the parts of the machine corresponding to parts of the above mentioned application are, to facilitate examination and comparison, similarly designated, and said drawings will now be referred to in describing the novel features of this invention.

Figure 1 is a front elevation of the machine complete, with part of the frame broken away:

Fig. 2, an elevation of the right hand side of Fig. 1:

Fig. 3, a vertical section of part of the machine on line 3, 3, Fig. 2, on an enlarged scale:

Fig. 4, a right hand side view of Fig. 3:

Fig. 5, a plan of the separating thread layer controlling means:

Fig. 6, a front elevation of Fig. 5:

Fig. 7, shows a portion of the circular cam carrier of the horizontal needle bed:

Fig. 8, an elevation of the same:

Fig. 9 shows another portion of the cam carrier of the horizontal needle bed, diametrically, opposite to the part shown in Fig. 7:

Fig. 10, an elevation of the inner side of Fig. 9:

Fig. 11, a sectional view on line 11, Fig. 9:

Figs. 12 and 13, details of parts of the cam actuating devices:

Figs. 14 and 15 illustrate, in plan, diametrically opposite portions of the cam carrier showing other cam controlling devices:

Figs. 16 and 17 are elevations of the parts Figs. 14 and 15 respectively:

Fig. 18, a plan view of part of cylinder needle bed cam carrier and one of the cam actuating devices:

Fig. 19, a front elevation of the same:

Fig. 20, a fragmentary view of the cam:

Fig. 21, a sectional view on line 21, 21 Fig. 19:

Fig. 22, a sectional view on line 22, 22, Fig. 19:

Figs. 23 and 24 views of parts of the cam controller, detached:

Fig. 25, a plan view of another part of cylinder needle bed cam carrier and its actuating device:

Fig. 26, a front elevation of the same:

Fig. 27, a transverse section on line 27, 27, Fig. 26; and

Fig. 28, a similar section on line 28, 28, Fig. 26:

Figs. 29 and 30 are views showing diametrically opposite sides of the circular guideway for the thread carriers:

Fig. 31, a vertical section, on an enlarged scale, on line 31, 31, Fig. 30; and Fig. 32, a diagrammatic view illustrating the four cam carriers and driving gear.

The main parts of the machine, as shown in the before-mentioned application, consist of a bed plate 24 above which is a flat ring 26 supported by standards 25, 25. The cylinder needle bed 28 is supported by under brackets 27, and the flat needle bed 30 by a central bracket 29. An upper stationary ring 32 is carried by curved standards 31, 31, and is provided with inside and outside dovetail guide ways.

A system of driving gear comprising a shaft 33, pulley 35, pinion 36, gear wheel 37, miter wheels 39, 40 and 41 actuates the cam carrier 137 of the horizontal needle bed and the cam carrier 88 of the cylinder needle bed through the medium of the shaft 42 connected to miter wheel 40 and a sleeve connected to the miter wheel 41, the arrangement being such that the two cam carriers rotate in opposite directions.

The other cam carriers 73 of the cylinder needle bed, shown in Figs. 2 and 3, and 74, partly shown in Fig. 3, are also driven by the same gear in opposite directions. The cam carriers 88 of the cylinder needle bed and 74 of the horizontal needle bed travel in the same direction, and the outer cam carrier 137 of the horizontal needle bed and the upper carrier 73 of the cylinder needle bed travel together in the opposite direction. This arrangement and operation of cam carriers is similar to that described in my U. S. Letters Patent No. 868,276 dated October 15, 1907; it being understood that the needles are provided with two butts and the cams of the carriers 73 and 74 are adapted to produce ordinary knit stitches as shown in said patent and need no further description here. The cams of the carrier 88 acting on the lower butts of the needles of the cylinder bed and the cams of the carrier 137 acting on the outer butts of the horizontal bed are the ones to which this invention relates, the new mechanism being designed to automatically actuate these cams, as hereafter described. A means for operating the cam carriers is diagrammatically illustrated in Fig. 32. In this view the shaft 42 has secured to its upper end a pinion 75 which meshes into gear $75^a$ of carrier 73, and also a pinion 76 which meshes into gear $76^a$ on a sleeve 77 surrounding the vertical shaft $77^a$. Near the upper end of the sleeve connected to the miter wheel 41 is a pinion 78 acting in the internal gear wheel $78^a$ of the lower cam carrier 88 of the cylinder bed, and a pinion 79 acting in the gear wheel $79^a$ secured to the lower end of the shaft $77^a$, to the upper end of which is connected, by a spider frame, the outer cam carrier 137 of the horizontal needle bed. These gear wheels and pinions are proportioned to cause the cam carriers to travel at uniform speed.

As set forth in the before mentioned patent the needles of the two needle beds are divided into two groups, there being gaps or blank spaces between the ends of the groups. The cams continuously rotated pass over and act on the groups of needles alternately and pass by one another at the blank spaces between the groups of needles, and as there are four sets of cams, traveling in pairs in opposite directions, and four groups of needles, being actuated in pairs, that is adjacent groups of the two needle beds together, all of the groups of needles are simultaneously operated and the only loss of time in the knitting process is when the cams are passing from one group to the other over the comparatively short gaps in the needle beds between the groups of needles.

The mechanism indicated by numerals 48, 49, 86, 87, 200, 202, 203, 204, and 206 control the needle racking devices, and the parts marked 243, 244, 245 represent the feeding means for the goods as produced by the knitting beds. All of these parts so far referred to being outside this invention will not be further described.

The direct means for operating the needle cam controllers and the separating thread layer, constituting the essential features of this invention, consist of two vertically sliding bars 44 and 45, which are actuated by a system of pattern chains 46, 47, 50 and 51, and the connecting mechanism 61, 62, 63, 64, 70, 71, 72, all fully described in the before-mentioned application.

There are two sets of cams for each of the two sets of needles, the needles of each set, that is the cylinder bed needles and the horizontal bed needles are divided into two groups, and all of the needles are provided with two butts. The cam carrier for the upper butts of the cylinder bed needles is shown at 73, Fig. 3, and a cam carrier 74 for the inner butts of the horizontal bed needles is also used; neither of these carriers nor the cams carried by them form any part of this invention, being included in and fully described in my U. S. Letters Patent No. 868,276, dated Oct. 15, 1907.

The vertical sliding rod 44, held and guided in bearings 53, has connected to its upper end a lever 55 which controls the operating device of the cam 138 of the horizontal needle bed that is active when the separating thread is being laid; at its central part the lever 57 for actuating the separating thread device, and at its lower part the lever 59 for controlling the actuating device of the cam 90 of the cylinder needle bed, which is also active when the separating thread is being laid. The other vertical rod 45 is connected at its upper end to a lever 56 which controls cams 139, 140 and 141 of the horizontal needle bed, and is connected at its lower part to the lever 58 which controls the cams 112, 113, 114 of the cylinder needle bed. These levers are respectively centrally fulcrumed to suitable brackets on the frame, lever 55 at 80, lever 56 at 81, lever 57 at 82, lever 58 at 83 and lever 59 at 84, see Fig. 3, in which view they are shown in normal knitting positions. The outer ends of these levers pass through slots in the rods 44, 45, and are caused to move with the rods by pins 46 acting in elongated holes formed in the ends of the levers.

Referring to Figs. 18 to 28. 88 indicates the cam carrier for the cylinder needle bed attached to a ring 89, Fig. 3. which is continuously rotated. The cams for controlling the needles of the cylinder needle bed are carried on a frame 91 secured by screws 92 to the cam carrier 88. The cam system for forming elongated or "tuck" stitches consists of a triangular cam 112 at the end of a long cam 113 for depressing the needles after their butts have passed off the cam 113. In the face of cam 113 is placed a triangular latch 114 pivoted at 115 to the frame 91 and so formed that when in downward position one of its sides forms a continuation of the face of cam 113 so that the loops held by the needles are not cast off, and when it is raised it constitutes the riser for the needles to cast off the retained loops when the next succeeding course is formed. The cam 112 is also set in upper position at this time, thus forming less slack, reducing the amount of yarn in the loops, than that when a "tuck" stitch is being formed with said cam in lower positions. The cam 112 is carried on the inner end of a rod 126 with a guide plate 93 fitted to slide in an angularly arranged bearing on the inner side of the frame 91, the outer end of said rod being attached to a slide 122 held in a guideway 123 on the outer side of the frame 91 correspondingly arranged to the angular bearing of the plate 93 to which the cam 112 is attached. The lower end of the slide 122 is shaped to be acted upon by an incline recess 94 in the edge of a plate 95 secured by screws 96 to a slide 97, which, by slotted openings 98, is held on the cam carrier 88 by screws 99. The head of one of the screws 99 under the plate 95 is seated in a depression around its slot 98, as shown in Figs. 19 and 23. The holes in the plate 95 through which the screws 96 pass are vertically elongated to provide for adjustment of said plate for properly determining the amount of movement of the cam 112; the slide 122 being held against the active incline surface of the plate 95 by means of a spring 128 attached to the rod 126, see Fig. 21. On the inner side of the slide 97 shown in Figs. 18, 19, 20 secured by screws 100, is bracket piece 101 having its inner end cam-shaped or inclined at 102 to act on a pin 132 extending from the latch 114 through a curved slot formed in the inner part of the frame 91; the arrangement being such that when the slide is moved toward the right both the cam 112 and latch 114 are raised, and they move down when the slide is set in reverse direction.

To facilitate setting the bracket piece 101 it may be secured to the outer face of slide 97, as shown at Fig. 24, being held thereon by screws 103 passing through a long slot 104 in the bracket piece 101. The upper edge 105 above the active incline edge 102, which holds the latch in upper position, is also shown longer in this view than in the other views. Slot 104 is sufficiently long to set the edge 105 so that it will remain under the pin 132 and hold the latch out in casting off position all the time if desired.

The slide 97 is provided with an open slot bearing, between two extending horns 106, in which a rounded end of a lever arm 107 works, said lever arm being by a stud bolt 108 pivotally connected to an extension 109 of the bracket 116 secured by screws to the cam carrier 88. This bracket 116 carries parts of the thread controlling mechanism as hereafter described. The lever arm is provided with two tappets 117, 118, near its fulcrum and arranged one above the other and so located as to strike the end of the lever 58, as the cam carrier rotates, when set in the paths of travel of the tappets. With the machine operating under normal condition, that is when it is producing regular knitting stitches, the active end of the lever 58 is in upper position and is struck by the tappet 117, moving the arm 107 into position shown by the dotted line 107ª, Fig. 18, thus moving the cam 112 down and the latch 114 up in active position, as shown by the dotted lines 114ª, see Fig. 20, and these parts so remain until the lever 58 is moved down to co-act with the tappet 118 when "tuck" stitches are to be made, thus setting the arm 107 as shown by the full lines and actuating cam 112 and latch 114, as before described.

The "tuck" stitch forming mechanism of the horizontal bed of needles is controlled by the lever 56, which being connected to the vertical rod 45 acts in unison with the lever 58. The needle cams act on the outer butts of the needles and are in all essential respects structurally and operatively similar to the corresponding cams of the cylindrical needle bed, previously described. They are attached to a frame plate 142 secured to the cam carrier 137, by screws 143, diametrically opposite to the controlling device that is actuated by the lever 56; they comprise a long cam 140 provided with a pivoted latch 141, and a triangular cam 139 adapted to be raised and lowered relative to the long cam, and the mechanism for directly actuating the cams is similar to that applied to the cams 112, 113, and 114.

Referring to Figs. 7 to 13 it is seen that cam 139 is carried on the lower end of a rod 126ª and has a guide piece 137ª which slides in an angularly arranged slot in the under plate of the frame 142. The upper end of rod 126ª is secured to a slide 122ª held in a guide-way 123ª and having its inner end shaped to be acted upon by the cam surface 184 of a plate 185 secured by screws 186 to a semicircular flat operating ring plate 155, the holes in plate 185 through which the screws 186 pass being slotted to provide for adjustment of action of the cam face 184 on the slide 122ª. A spring 128ª acting on the rod 126ª holds the point of the slide 122ª against the cam surface of plate 185. The semicircular flat plate 155 has slots at its ends through which screws 156 pass to hold the plate on the cam carrier and act as guides therefor. The cam latch 141 is moved into outer position by a cam ledge 187, acting on the stud 132ª of the latch and forming part of a bracket 188 secured by screws to the under side of the semicircular plate 155; the arrangement being such that when the plate 155 is moved in a right-hand direction relative to the cam carrier 137 the latch 141 and cam 139 are raised or moved outwardly. A modification of the bracket which carries the cam ledge 187 is shown at Fig. 13. In this construction the bracket 188ª is secured to the upper side of the semi-circular operating plate 155 by screws which pass through a long slot, as shown, thus allowing the bracket to be set forwardly a sufficient distance for the edge 105ª to remain under the stud 132ª and hold the latch 141 out when the flat ring plate 155 is moved into the position shown in the drawings.

To the opposite end of the flat ring plate 155 is secured a short standard lug 189, to which is pivotally connected, by a screw stud 190, one end of a link 191, the other end of which is pivotally connected to the end of a lever arm 192. This arm rocks on a screw stud 193 secured to a standard 194 which is connected to the cam carrier 137. The upper part of this lever arm above the stud 193 is provided with a slotted bearing 195, in which acts the rounded end of an arm 196 fitted to rock on a vertical post 197 extending upwardly from the top of the standard 194, and this arm is provided with or connected to two tappets 198 and 199 arranged so that in their paths of travel they will contact with and be acted upon by the controlling lever 56. These tappets are in different horizontal planes, as shown in Fig. 8, the upper one 199 being acted upon, as the cam carrier rotates in direction indicated by the lever 56, when said lever is in upper normal position and the lower one is actuated by the lever 56 when its operating end is depressed by the upward movement of the rod 45. This latter condition arises when "tuck" stitches are to be made. The cams and other parts then occupy the positions shown in the drawings. Assuming that the cam carrier 137 has made one or more revolutions causing the formation of one or more "tuck" stitches, or the retention of two or more loops on the needles, and that the lever 56 has been moved into upper position, as shown at Fig. 3, the tappet 199 will now strike the lever 56, be moved into position of the dotted lines 199ª, the arm 192 into position of the dotted lines 192ª and the cam ledges 184 and 187 moved forwardly. The cam 139 will then be moved up and the latch 141 raised into active position and so remain until "tuck" stitches are again to be formed.

The lever 57 controls the separating thread mechanism and in its upper inactive position moves the upper tappet 210 moving it, as shown in Fig. 5, to bring the wedge 211 behind the block 212 of the spring latch 172 and so hold said latch out of action. This tappet 210 with the tappet 213 arranged in a lower plane are connected to or form a part of a horizontal arm 214, which, by a pivotal connection 215 is carried by an extension 216 of a frame 217 fastened by screws to the top of the bracket 116 which is secured to the lower cam carrier of the cylinder needle bed. The free end of the arm 214 is rounded and works in an open slot bearing 218 extending from a slide 219. This slide has guide slots formed at its ends and is held against the side of frame 217 by screws 220. The wedge 211 is formed at the upper part of a plate 221 which is secured by screws to the slide 219. The latch 172 is fitted to slide in a head 222 forming a part of the frame 217 and surrounding its stem, to which the block 212 is attached, is a spring 177 acting to force the latch out when the wedge 211 is withdrawn from the block 212. This occurs when the active end of lever 57 is depressed by the upward movement of the rod 44. The tappet 213 then strikes the lever and the arm 214 is set in the position shown by the dotted lines 214ª, carrying the slide 219 with it, moving the wedge 211 away from the block 212 and so freeing the latch 172 to be forced out by its spring 177. In this outer position the latch contacts with the lug 170 of the separating thread carrier block 161 and moves the thread carrier around on the guide-way ring 32. At the next revolution of the cam carrier the lever 57 is up in position to be struck by the tappet 210, which again causes the wedge 211 to withdraw the latch to miss the lug 170.

Referring to Figs. 29, 30 and 31, the two-separating thread carriers 160 and 160ª are attached to blocks 161 and fitted to slide on a dove-tail guide way 162 formed on the inner side of the top stationary ring 32. On this guideway are also held two blocks 163, which carry cam ledges 164 and 165, said blocks being held in position on opposite sides of the ring 32 by set screws, as shown in Figs. 29 and 30. The outer side of ring 32 is also formed with a dove-tail to hold blocks 166, which in normal arrangement and adjustment of the various parts of the machine are held, by set screws, in line with the blocks 163. Each of the blocks 166 carry cam ledges 167 and 168, whose functions with those of ledges 164 and 165 will be hereafter described. The blocks 161 have at their upper inner sides a lug 169 and at their lower outer sides a lug 170, and these lugs are acted upon by spring actuated latches 171 and 172 respectively, latch 171 being held in a head 173 on the upper part of a bracket 174 secured to the outer cam ring 137 of the horizontal needle bed. Said latch is forced into and held in outer position by a spring 175. The latch 172 is similarly held in a head 176 and forced into outward position by a spring 177, said head 176 being carried by the lower cam carrier 88 of the cylinder needle bed, and this latch is automatically actuated as before described. To elucidate the manner of laying or feeding the separating threads and their relation to the regular knitting threads, the carriers for the regular threads, in all essential respects similar to the carriers 160, 160ª, are shown by dotted lines 178 and 179 and are provided with lugs 180 and 181 arranged to co-act with spring actuated latches 182 and 183 respectively, also shown by dotted lines. The latch 182 is carried by the cam carrier 137 and the latch 183 carried by the lower cylinder cam carrier. The positions of these latches permanently fixed relative to the latches 171 and 172 respectively are substantially as shown.

Now, when ordinary knitting is being done on the machine, the separating thread controlling latch is held out of action as shown. With the thread carriers in the positions indicated, the latch 183 will pick up carrier 178 and move it somewhat less than half-way around the ring 32, leaving it adjacent the block 166 by the latch riding up the cam end of the ledge 168, and simultaneously the latch 182 picks up the carrier 179 and moves it in the opposite direction to position adjacent the carrier 160ª and leaves it there by the latch 182 riding up on the ledge 165. The latches continuing their circular movement, the latch 183 slides off the ledge 168, picks up the carrier 179 and returns it to its original position; and the latch 182 slides off the ledge 165, picks up carrier 178 and returns it to the position shown. Thus in one revolution of the machine two rows or layers of stitches are formed at each side of the machine. The two groups of needles in both the cylinder and horizontal beds are actuated by their cams to adequately co-act with the thread carriers. When the separating threads are to be inserted at the completion of a knitted article or section of the goods formed, the latch 172 is automatically freed and picks up the thread carrier 160 at about the same time the latch 183 picks up the carrier 178, and at the same time the latch 182 moves the thread carrier 179, all of said carriers being now moved at the opposite side of the ring 32. Latch 183 now picks up carrier 179, latch 172 picks up carrier 160ª, latch 171 takes carrier 160 and latch 182 takes carrier 178, so at the termination of this half revolution of the machine the carriers occupy the positions shown with the exception of carrier 160ª which is adjacent the carrier 179, but it is, during the next half revolution, returned by the latch 171 to its original position, as shown. At the termination of one full revolution the latch 172 is automatically moved out of action, and it will be seen that the separating thread carriers 160, 160ª in making a forward and backward movement present their threads to the needles between two knit courses of the regular threads. The upper cam ledges on the inside of the ring and the lower ones on the outside of the ring control the separating thread latches, and the upper ledges on the outside of the ring and the lower ones on the inside of the ring control the regular ordinary knitting thread latches.

The latch 183 is spring actuated similar to the other thread carrying latches; it is held in a head 223 secured to the top of the bracket 116, a short distance ahead of the latch 172. The stem of latch 183 is provided with thumb piece and a pin 224 which works in a slot 225 in the head 223 to hold the latch in operative position. When it is desired to put the latch out of action it is drawn back by the thumb piece, turned for the pin to rest against the end of the head, as shown. On each of the cam carriers 88 and 137 is a cam that is set in operative position only when the separating thread is being laid. The cam 90 of the cam carrier 88 of the cylinder needle bed is secured to the inner end of a rod 226 which has a sliding bearing in the frame 91, and has at its outer end a block 227. A spring 228 forces and holds the cam in outer operative position. A slide 229 held on the carrier 88 by screws 230 has attached to it a plate 231 having a wedge-shaped end 232 adapted to pass behind the block 227 and draw the cam 90 out of action with the needles. This slide is controlled by an arm 233, the end of which works in an open slot bearing on the slide, said arm being secured to a short shaft 234 having a bearing in a standard 235 secured to the carrier 88. To the other end of the shaft 234 are fastened the tappets 236, 237, which are acted upon by the lever 59, the upper one 236, as shown at Fig. 25, being about to strike the lever, and the effect of this will be to move this tappet and arm 233, as shown by the dotted lines and so force the wedge 232 under the block 227. The cam 90 is thus moved out of active position. At the same time that the lever 57 is moved to make the separating thread controlling means active, the lever 59 is set to act on the tappet 237, causing the wedge 232 to be drawn away from the block 227, thus allowing the spring 228 to set the cam 90 into active position. The operating lever 55 is also at the same time set to cause the cam 138 of the cam carrier 137 to act on the needles of the horizontal needle bed. This cam is fastened to a rod 91ª passing vertically through the frame 142 and having a block 238 secured to its upper end, and a spring 92ª surrounding it above and bearing on the cam, to hold the cam in outer operative position, as shown at Fig. 17. A wedge plate 239 is secured to one end of a semicircular flat bar 145 attached to and fitted to slide on the cam carrier at the opposite side to and in the same manner as the semicircular flat sliding bar or plate 155. Screws 146 on the cam carrier pass through slots in the bar 145. On the other end of the bar 145 is secured a lug 147 to which is connected one end of a link 148, its other end being connected to the lever arm 149. This lever arm rocks on the screw stud 193 on the standard 194. The upper part 250 of the lever arm 149 has on open bearing 251 in which the rounded end of an arm 252 works, and is provided with or connected to two tappets 253, 254. The arm 252 is fitted to rock on the vertical stud 197, with the tappets so located as to contact with the lever 55 as the cam carrier 137 rotates. The screw stud 193 also carries the lever arm 192 and the vertical stud 197 also carries the arm 196 and tappets 198 and 199 of the controlling device of the other cams on the carrier 137 before described. The last action of the lever 55 was, by acting on the tappet 253, to set the parts as shown by the full lines. The wedge 239 was then withdrawn from the head 238 and the cam 138 set out and held in active position to operate the needles to form the loops of the separating thread. As seen by Fig. 14, the tappet 254 will next co-act with the lever 55 which has now been raised into the path of travel of said tappet, moving it, the arm 252, arm 149 and connected parts into position shown by dotted lines, the wedge 239 then being set under the head 238 and the cam 138 drawn from action with the needles, and it is so held until a separating thread has again to be applied to the knitted goods.

The tappets of each pair herein referred to are integral or rigidly connected and are located on opposite sides of a plane passing through their common axis, thus causing them, when acted upon in the same direction, to reciprocate the devices which they control.

I claim:

1. A knitting machine, comprising a cylinder needle bed, a cam carrier, means for rotating the cam carrier around the needle bed, cams on the cam carrier consisting of a needle controlling cam and a yarn drawing cam adapted to set the needles to produce tuck stitches and to adequately form the loops therefor, two rigidly connected tappets having a rocking bearing carried by the cam carrier, said tappets being in different horizontal planes, a connection between the tappets and the cams to simultaneously move them, a lever adapted to move either one of the tappets and means for automatically setting the lever in position to move one of the tappets to set the cams into "tuck" stitch forming position and then set it in position to move the other tappet to set the cams in normal position for the production of ordinary stitches.

2. A knitting machine, comprising a cylinder needle bed, a cam carrier, means for rotating the cam carrier around the needle bed, cams on the cam carrier consisting of a movable drawing-down cam and a latch constituting a casting-off cam, two tappets having a rocking bearing carried by the cam carrier, said tappets being in different horizontal planes, an arm connected to the tappets, a sliding plate actuated by the arm carrying an inclined cam edge for moving the drawing down cam and a cam ledge for setting the latch into casting off position and a lever for actuating the tappets.

3. A knitting machine, comprising a cylinder needle bed, a cam carrier, means for rotating the cam carrier around the needle bed, cams on the cam carrier, two rigidly connected tappets having a rocking bearing carried by the cam carrier, said tappets being in different horizontal planes, a connection between the tappets and the cams, a lever having a rocking bearing mediate its ends, a vertically sliding bar to which one end of the lever is pivotally connected and means for automatically moving the vertical bar to set the other end of the lever alternately in the paths of travel of the two tappets.

4. A knitting machine, comprising a cylinder needle bed, a cam carrier, means for rotating the cam carrier around the needle bed, cams on the cam carrier consisting of a movable drawing-down cam and a latch constituting a casting-off cam, two tappets having a rocking bearing carried by the cam carrier, said tappets being in different horizontal planes, an arm connected to the tappets, a sliding plate actuated by the arm carrying an inclined cam edge for moving the drawing-down cam and a cam ledge for setting the latch into casting off position, a lever for actuating the tappets having a fulcrum bearing mediate its ends and movable in a vertical plane whereby its inner end may be set to act alternately on the tappets, a vertically sliding bar to which the other end of the lever is pivotally connected and means for automatically moving the sliding bar.

5. A knitting machine, comprising a horizontal or dial needle bed, a circular cam carrier located above the horizontal needle bed, means for rotating the cam carrier, movable cams carried by the cam carrier consisting of a needle controlling cam and a yarn drawing cam adapted to actuate the needles to produce tuck or ordinary stitches and to adequately form the loops therefor, two rigidly connected tappets having a common center and arranged in different horizontal planes and fitted to rock on a vertical stud, an operating connection between the tappets and cams to simultaneously move them, a centrally pivoted lever, a bar fitted to slide in vertical bearings and to which one end of the lever is pivotally connected and means for automatically moving the vertically sliding bar whereby the other end of the lever is set to alternately move the tappets.

6. A knitting machine, comprising a horizontal or dial needle bed, a circular cam carrier located above the horizontal needle bed, means for rotating the cam carrier, movable cams carried by the cam carrier adapted to actuate the needles to produce tuck or ordinary stitches, two rigidly connected tappets arranged on opposite sides of their common axis and in different horizontal planes and fitted to rock on a vertical stud, an operating connection between the tappets and cams, comprising an arm extending from and rigidly connected to the tappets, a vertically disposed lever having its upper end in operative connection with the arm, a sliding plate on the cam carrier with means at one end whereby it is actuated by the lower end of the vertically disposed lever and with means at its other end for actuating the cams, a centrally pivoted lever, a bar fitted to slide in vertical bearings and to which one end of the lever is pivotally connected and means for automatically moving the vertically sliding bar whereby the other end of the lever is set to alternately move the tappets.

7. A knitting machine, comprising a cylinder needle bed and a superimposed horizontal needle bed, a cam carrier at the lower part of the cylinder needle bed, and a cam carrier located above the horizontal needle bed, means for rotating the cam carriers in opposite directions, movable cams on each of the cam carriers, two tappets arranged in different horizontal planes fitted to rock on vertical axes carried by the cam carriers, a centrally pivoted lever for each pair of tappets, a bar fitted to slide in vertical bearings to which one end of each of the levers is pivotally connected, means for automatically moving the bar whereby the other ends of the levers are set to alternately move their co-acting tappets, and operating connections between the two pairs of tappets and their respective cams.

8. A knitting machine, comprising a cylinder needle bed and a superimposed horizontal needle bed, a cam carrier at the lower part of the cylinder needle bed and a cam carrier located above the horizontal needle bed, means for rotating the cam carriers in opposite directions, movable cams on each of the cam carriers, two tappets arranged in different horizontal planes fitted to rock on vertical axes carried by the cam carriers, a centrally pivoted lever for each pair of tappets, a bar fitted to slide in vertical bearings to which one end of each of the levers is pivotally connected, means for automatically moving the bar whereby the other ends of the levers are set to alternately move their co-acting tappets, an arm extending from each pair of tappets, an operative connection between the arm and the cams of the lower cam carrier, a vertically disposed lever, the upper end of which connects with the arm of the upper pair of tappets, and an operative connection between the lower end of this lever and the cams of the upper cam carrier.

9. A knitting machine, comprising a cylinder needle bed and a superimposed horizontal needle bed, a cam carrier at the lower part of the cylinder needle bed and a cam carrier located above the horizontal needle bed, means for rotating the cam carriers in opposite directions, movable cams on each of the cam carriers, adapted to be moved into and out of action with the needles of the two needle beds, two pairs of tappets arranged in different horizontal planes fitted to rock on vertical axes carried by the cam carriers, a centrally pivoted lever for each pair of tappets, a bar fitted to slide in vertical bearings to which one end of each of the levers is pivotally connected, a separating thread carrier controller, comprising a sliding spring actuated latch, a head secured to its stem, a sliding plate provided with an inclined cam ledge adapted to move under the head to withdraw the latch out of action, two rigidly connected tappets rocking on a vertical axis and having an arm operatively connected to the sliding plate, a lever pivotally connected at one end to said vertically sliding bar, the other of which is located to co-act with latch controlling tappets and automatic means for moving the vertical bar whereby the cams and latch are simultaneously moved into and out of active positions.

In testimony whereof I have hereunto subscribed my name.

HERMANN A. KLEMM.

Witnesses:
A. J. MICHELS,
L. F. BROWNING.

Copies of this patent may be obtained for five cents each, by addressing the "Commissioner of Patents, Washington, D. C."